(12) United States Patent
Dabiri et al.

(10) Patent No.: US 7,864,305 B2
(45) Date of Patent: Jan. 4, 2011

(54) SELF-CONTAINED UNDERWATER VELOCIMETRY APPARATUS

(75) Inventors: John Oluseun Dabiri, Pasadena, CA (US); Kakani Katija Young, Pasadena, CA (US); John H. Costello, Providence, RI (US); Sean P. Colin, Kingston, MA (US)

(73) Assignees: California Institute of Technology, Pasadena, CA (US); Roger Williams University, Kingston, MA (US); Providence College, Providence, RI (US)

( * ) Notice: Subject to any disclaimer, the term of this patent is extended or adjusted under 35 U.S.C. 154(b) by 427 days.

(21) Appl. No.: 12/027,122

(22) Filed: Feb. 6, 2008

(65) Prior Publication Data

US 2010/0039638 A1    Feb. 18, 2010

Related U.S. Application Data

(60) Provisional application No. 60/900,427, filed on Feb. 9, 2007, provisional application No. 60/931,433, filed on May 23, 2007.

(51) Int. Cl.
*G01P 3/36* (2006.01)
(52) U.S. Cl. ........................................ 356/28; 356/28.5
(58) Field of Classification Search ........ 356/3.01–28.5
See application file for complete search history.

(56) References Cited

U.S. PATENT DOCUMENTS

| 6,650,799 | B2 * | 11/2003 | Lyons ........................... 385/12 |
| 2004/0223135 | A1 * | 11/2004 | Ortyn et al. .................... 356/28 |
| 2007/0115455 | A1 * | 5/2007 | Ilev et al. ...................... 356/28 |
| 2009/0026387 | A1 * | 1/2009 | Squier et al. ............. 250/492.1 |
| 2009/0107230 | A1 * | 4/2009 | Okcay et al. ................... 73/148 |

OTHER PUBLICATIONS

W.A.M. Nimmo Smith et al "PIV measurements in the bottom boundary layer of the coastal ocean" in *Experiments in Fluids* 33 (2002) p. 962-971.*
Downloaded website of 5.0MP Underwater Digital Camera Mask from http://www.tiquidimageco.com/home/specs.hmtl, on Feb. 6, 2008.*
Luca Bertuccioli et al. "A Submersible Particle Image Velocimetry System for Turbulence Measurements in the Bottom Boundary Layer" in *American Meterological Society* (1999) vol. 16, p. 1635-1646.

(Continued)

*Primary Examiner*—Thomas H Tarcza
*Assistant Examiner*—Luke D Ratcliffe
(74) *Attorney, Agent, or Firm*—Steinfl & Bruno LLP

(57) ABSTRACT

A velocimetry apparatus and method for the collection of target-specific images of fluid motions are disclosed. The apparatus includes a camera and a light source. The camera collects and provides images of the fluid showing instantaneous positions of particles in the fluid. The light source provides a light sheet (two-dimensional) or volume (three-dimensional) to illuminate the particles. The camera and the light source are powered by portable energy sources and measure instantaenous velocity of the fluid in a field of view. Shape and distance between first camera, the light source and the portable energy sources are so configured that the apparatus is a self-contained apparatus portable by a diver during operation thereof.

29 Claims, 6 Drawing Sheets

OTHER PUBLICATIONS

J. Katz et al. "Submersible holocamera for detection of particle characteristics and motions in the ocean" in *Deep Sea Research I* (1999) 46, p. 1455-1481.

W.A.M. Nimmo Smith et al. "PIV measurements in the bottom boundary layer of the coastal ocean" in *Experiments in Fluids* 33 (2002) p. 962-971.

M. Raffell et al. "Particle Image Velocimetry: A Practical Guide" (1998) *New York Springer*, Section 1.2, 3-6.

Steinbuck, J.V. et al Small scale turbulence measurements with a freefalling DPIV profiler. Presented at 2004 *Amer. Geophys. Un.*

H.M. Tritico et al. "Development, testing and demonstration of a portable submersible miniature particle imaging velocimetry device" in *Meas. Sci. Technol.* 18 (2007) p. 2555-2562.

C.E. Willert et al. "Digital particle image velocimetry" in *Experiments in Fluids* 10 (1991) p. 181-193.

C.E. Willert et al. "Three-dimensional particle imaging with a single camera" in *Experiments in Fluids* 12 (1992) p. 353-358.

Downloaded website of 5.0*MP Underwater Digital Camera Mask* from http://www.liquidimageco.com/home/specs.hmtl on Feb. 6, 2008.

\* cited by examiner

SELF-CONTAINED UNDERWATER VELOCIMETRY APPARATUS

CROSS-REFERENCE TO RELATED APPLICATIONS

The present application claims the benefit of U.S. Provisional Application Ser. No. 60/900,427 filed on Feb. 9, 2007 for a "Self-Contained Underwater Velocimetry Apparatus" by Kakani Katija Young and John Oluseun Dabiri and U.S. Provisional Application Ser. No. 60/931,433 filed on May 23, 2007 for a "Self-Contained Underwater Velocimetry Apparatus" by Kakani Katija Young and John Oluseun Dabiri, the contents of both of which are incorporated herein by reference in their entirety.

FIELD

The present disclosure relates to underwater apparatus and methods. In particular, it relates to a self-contained underwater velocimetry apparatus and method for the collection of target-specific images of fluid motions.

BACKGROUND

References [1], [2] and [3] describe devices capable of collecting random or non-specific (as opposed to target-specific) images of water motions in a marine environment by using a laser light source to illuminate ambient particles in the water and by using a video camera to record those motions. The devices cannot measure a specific target (e.g. animal-water interaction) because they are left at one location on the ocean floor, or they are made neutrally buoyant and carried by ambient water currents. The devices require a link to the surface for purposes of remote control, data storage, and/or supply of the light source via fiber optic links. These external connections limit the spatial range of the device to a fixed radius around the surface connection point. The required external connections and the relatively large size of the devices (up to 1000 kilograms) make them unsuitable for operation by a SCUBA diver.

Reference [4] describes a device capable of collecting random or non-specific (as opposed to target-specific) images of water motions in a marine environment by using a free-falling video camera to record the motion of ambient particles in the water that are illuminated by a free-falling laser light source. Since the device is free-falling, the images the device collects are wholly determined by its vertical trajectory in the water as it falls. Therefore, the device cannot collect target-specific images. The device requires a link to the surface for purposes of remote control, data storage, and/or supply of the light source via fiber optic links. The free-falling nature of the device, the required external connections, and its relatively large size (up to 1000 kilograms) make it unsuitable for operation by a SCUBA diver.

Reference [5] describes a device capable of collecting images of water motions in fluvial environments (i.e. rivers). Similarly to the apparatuses of the previously mentioned references, the device collects images of water motions by using a laser light source to illuminate ambient particles in the water and by using a video camera to record those motions. The device is kept stationary in the water and requires a link to the shore for the purpose of remote control. Due its stationary nature, the device is incapable of tracking moving targets. In addition, its external connection limits the spatial range of the device to a fixed radius around the surface connection point. The external connection also makes the device unsuitable for operation by a SCUBA diver.

Various remotely-operated and SCUBA diver-operated devices have been designed for the purpose of target-specific video recordings of marine life. Devices in the former group (e.g., devices made by the company SeaBotix, Inc.) require external connections to the surface, similar to the limitation of the devices described above. In addition, the propulsion units on the devices can startle and/or damage sensitive marine life. Devices in both groups are capable of recording biological life, but not the water motions around them.

SUMMARY

According to a first aspect of the present disclosure, a velocimetry apparatus for the collection of target-specific images of fluid motions is provided, comprising: a first camera, adapted to collect and provide images of a fluid showing instantaneous positions of particles in the fluid; a timing circuit associated with the first camera, controlling a frame rate of the first camera; a light source adapted to provide a light sheet or volume to illuminate the particles in the fluid; and one or more portable energy sources adapted to power the first camera, the timing circuit and the light source, wherein the first camera and the light source are adapted to measure instantaneous velocity of the fluid in a field of view by way of a digital particle image velocimetry technique, and wherein shape and distance between the first camera, the timing circuit, the light source and the one or more portable energy sources are so configured that the apparatus is a self-contained apparatus portable by a diver during operation thereof.

According to a second aspect of the present disclosure, a method for collection of target-specific images of fluid motion to be performed by a diver is provided, comprising: illuminating particles in a fluid; and collecting images of the illuminated particles to measure instantaneous velocity of the fluid by way of a digital particle image velocimetry (DPIV) technique, said technique taking into account compensation of diver motion.

Additional aspects and embodiments are provided in the specification, claims and drawings of the present disclosure.

In accordance with the present disclosure, target-specific images of water motions in marine environments are collected. These images include, but are not limited to, animal-water interactions in the ocean and other physical-biological interactions. The water motion is inferred from the motion of ambient particles suspended in the water that are illuminated by a light source and recorded by a video camera. The device is controllable by a SCUBA diver at the target site.

A first advantage of the apparatus shown in the present disclosure is that while the devices of References [1]-[5] are incapable of collecting target-specific images of water motions in marine environments, the apparatus of the present disclosure is capable of collecting target-specific images of water motions in marine environments. In particular, targeting is accomplished by visual inspection and manual control by a SCUBA diver operating the device, aided by an on-board, real-time television display connected to the video camera. Therefore, target specificity is achieved through the combination of a diver, a camera, and a light (e.g., laser) source. The real-time television display is helpful, but not essential. For example, if the diver is able to tell that an animal is in the field of view of the camera based on the animal's spatial position relative to the apparatus, that might be sufficient for targeting, albeit with less accuracy than with the real-time television display.

A second advantage of the apparatus shown in the present disclosure is its unlimited spatial range. While the devices of References [1]-[5] have a spatial range of device movement limited by the length of external connections to the water surface, the apparatus of the present disclosure has an unlimited spatial range. This capability is important for collecting images of targets that move over long distances (i.e. longer than a given surface connection cable) during the measurement. The unlimited spatial range is accomplished by eliminating external connections to the device altogether. Therefore, unlimited spatial range is achieved by making the device self-contained.

Throughout the present disclosure, the term self-contained will be used to mean "not connected during use to external apparatus, such as a link, a robot arm or a surface connection."

A third advantage of the apparatus shown in the present disclosure is the possibility of a three-dimensional measurement. While the devices of References [1]-[5] are limited to measurement of water motion in a two-dimensional plane, the apparatus shown in the present disclosure is capable of collecting images of three-dimensional water motion in a target volume. This capability is achieved by imaging the water from two adjacent, parallel cameras. A defocusing technique is used to determine the three-dimensional motion.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the complexes, systems and methods herein disclosed.

DETAILED DESCRIPTION

The apparatus according to the present disclosure will be shown in a two-dimensional (2D) and three-dimensional (3D) embodiment.

The basis for quantitative flow measurements using the two-dimensional embodiment of the apparatus is a technique called digital particle image velocimetry (DPIV), discussed, for example, in References [6], [7] and [8]. By this technique the apparatus measures the instantaneous fluid velocity in an entire two-dimensional field of view. This is accomplished non-invasively, i.e., without the introduction of physical probe into the area of the flow being measured. Hence, spurious measurement artifacts due to the placement of a probe into the flow field, e.g. added turbulence or dissipation, are eliminated.

Figure 1:
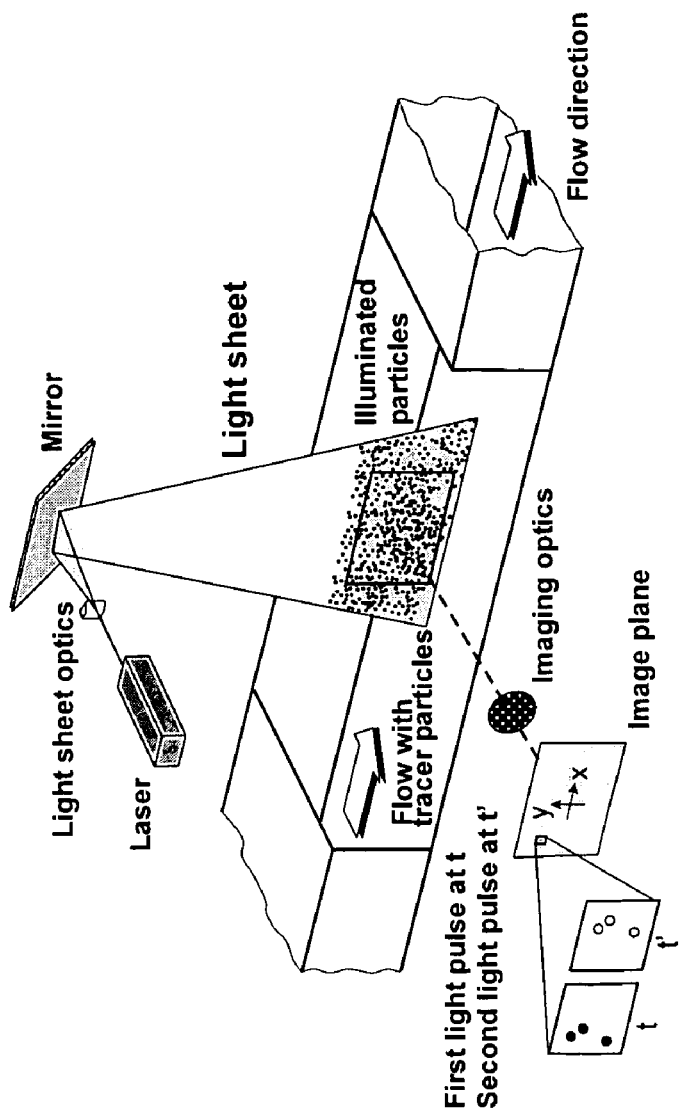
FIG. 1 shows a schematic illustration of a digital particle image velocimetry (DPIV) technique.

The basic setup is illustrated in FIG. 1, which is taken from Reference [8]. Since the fluid medium (e.g. seawater or freshwater) is typically transparent, the motion of the fluid flow is inferred from the motion of tracer particles in the fluid. These particles should be neutrally buoyant and small enough that they are carried passively by the ambient currents, yet large enough to be imaged by a video camera. In laboratory experiments, the particles are typically artificially seeded into the water. However, in most marine environments, the naturally-occurring particulate can be sufficient to visualize the fluid motion, as already demonstrated by third parties. See Reference [1].

The visibility of the particles is enhanced by illuminating them with laser light. Laser light is particularly useful because it can be formed into a thin sheet, enabling visualization of a two-dimensional cross-section of the flow field, as shown in FIG. 1. Where photosensitivity is an issue for the animals, invisible ultraviolet or infrared laser sources can be used in conjunction with special imaging optics. Such optics may comprise light filter placed in front of the camera that blocks all wavelengths of incoming light with the exception of the ultraviolet or infrared light that is reflected by the particles in the water.

Within the illuminated cross-section, one wishes to measure the instantaneous position of all of the particles. Standard video capture techniques will tend to blur the positions of the particles. Therefore, the laser is usually pulsed in order to "freeze" the imaged position of the particle or, as in the two-dimensional embodiment of this apparatus, a fast-shutter, high-speed camera is used. Therefore, generally speaking, a high-speed camera will be used in conjunction with non-pulsed light, while a normal digital camera is enough for pulsed light. However, if the water moves slowly enough, then a non-pulsed light source can be used also with a normal digital video camera. "High-speed" refers to any camera that records faster than the standard rate of 30 frames per second.

The camera frames will contain a series of images showing the instantaneous positions of all of the particles in the flow. The DPIV image processing algorithm (known as such to the person skilled in the art, see, for example, reference [6], incorporated herein by reference in its entirety) subdivides each frame into smaller windows, each containing only a few particles (see lower left portion of FIG. 1). The image data in each window is compared mathematically with the same window in the next frame (i.e. at time t and a later time t') to determine the average direction and magnitude of particle displacement (i.e. linear translation) between the frames. Dividing this displacement vector by the time interval between the frames (i.e. t'−t) gives the velocity vector of the flow at that point in the image. The temporal separation between adjacent frames is made as small as possible so that the computed velocity accurately approximates the true instantaneous flow velocities at times t and t'.

Figure 2:
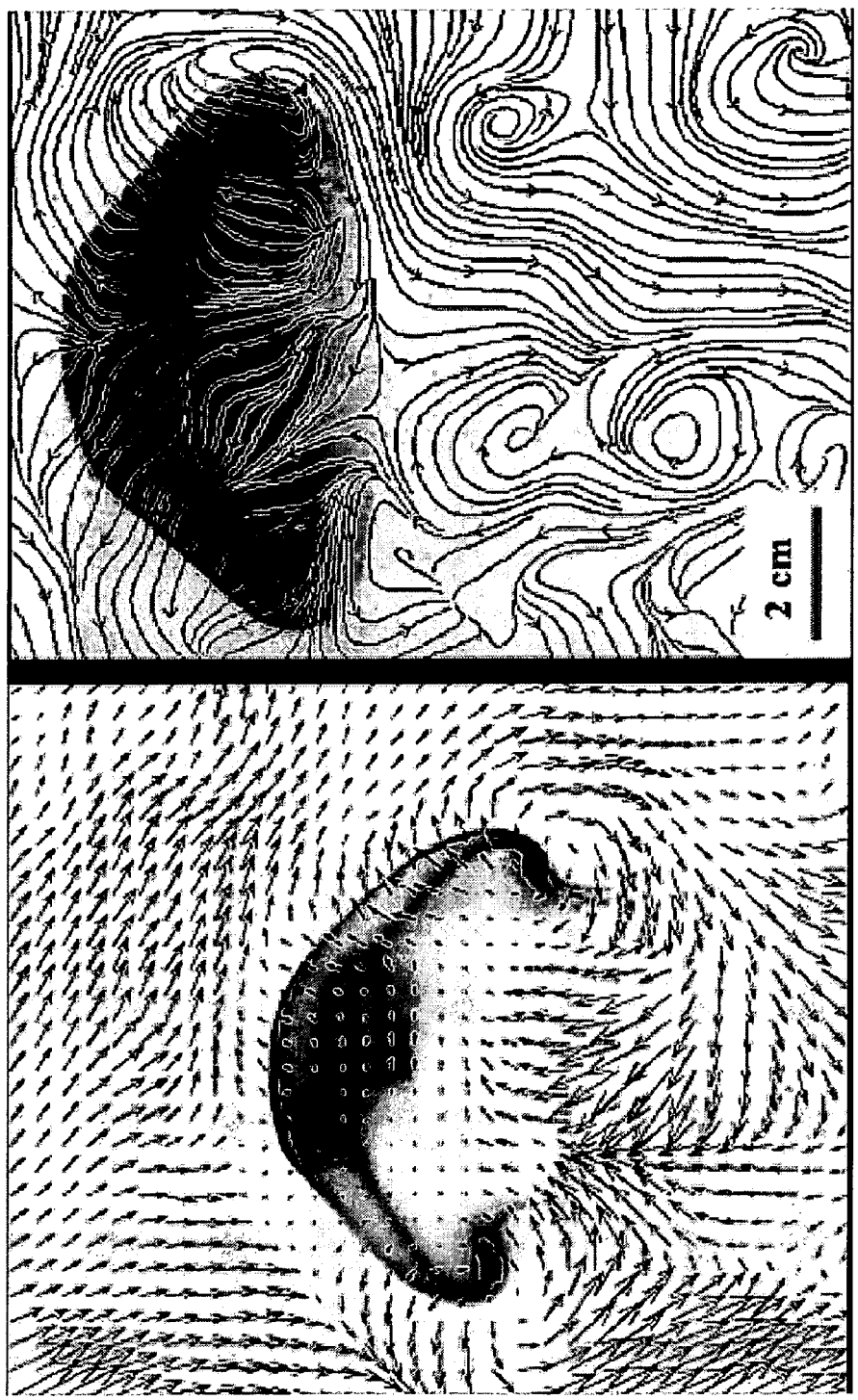
FIG. 2 shows velocity field and instantaneous streamlines from laboratory measurements of a swimming jellyfish measured by using DPIV.

FIG. 2 shows representative DPIV measurements of medusae (jellyfish) collected by using the laboratory technique described above. Upon reading of the present disclosure, the person skilled in the art will understand that the apparatus and methods herein described have many uses. For example, they could be used to measure just the water motion without any animal or plants in view. Some of the uses include interspecific differences in foraging behavior, predator-pray encounters in a realistic turbulent medium, energetics of locomotion, etc. Essentially, any physical phenomenon related to the natural ocean environment at the scale of a few meters and smaller can be addressed using the teachings of the present disclosure.

Since the DPIV method computes the average motion of multiple particles in a small window, it can tolerate the loss of particles out of the image plane that might occur due to three-dimensional effects, while still arriving at accurate results.

To be sure, the two-dimensional DPIV method cannot quantify any fluid motion perpendicular to the laser sheet. However, modified versions of the DPIV technique have resolved this difficulty in the form of 3D DPIV.

Figure 6:
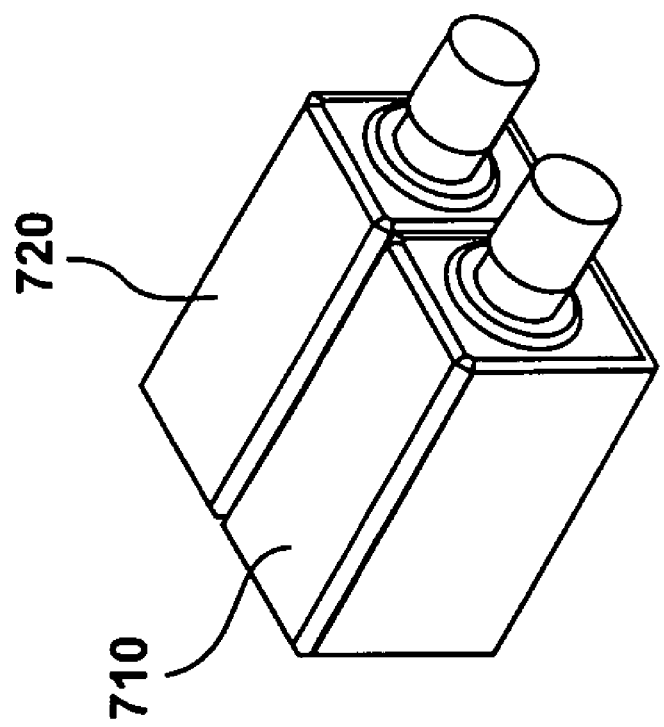
FIG. 6 shows a partial depiction of two cameras adapted to be used in the three-dimensional embodiment of the present disclosure.

As also shown in FIG. 6, in the 3D embodiment of the apparatus, two parallel cameras (710, 720) in the main housing (as opposed to a single camera) are used to image a 3D volume of the water (as opposed to a 2D plane in the water) containing ambient particles. In particular, the two cameras are side-by-side looking in the same direction, the reference plane being the plane in front of the camera in which the objects are in focus. Since the cameras are side-by-side, they will have the same focal plane (i.e. reference plane) as long as their lenses are identical with the same settings.

Given the horizontal spacing of the cameras, the relative position of each particle within the images captured by each camera can be used to determine the distance of the particle away from the front of the cameras. This information, combined with the average horizontal and vertical position of the particle images on the two cameras (see FIG. 6), is sufficient to compute the full, three-dimensional particle position, as demonstrated in prior art, see, in particular, Reference [7]. The motion tracking technique illustrated in FIG. 2 is then applied in 3D to determine the velocity field throughout the illuminated volume of water.

Figure 3:
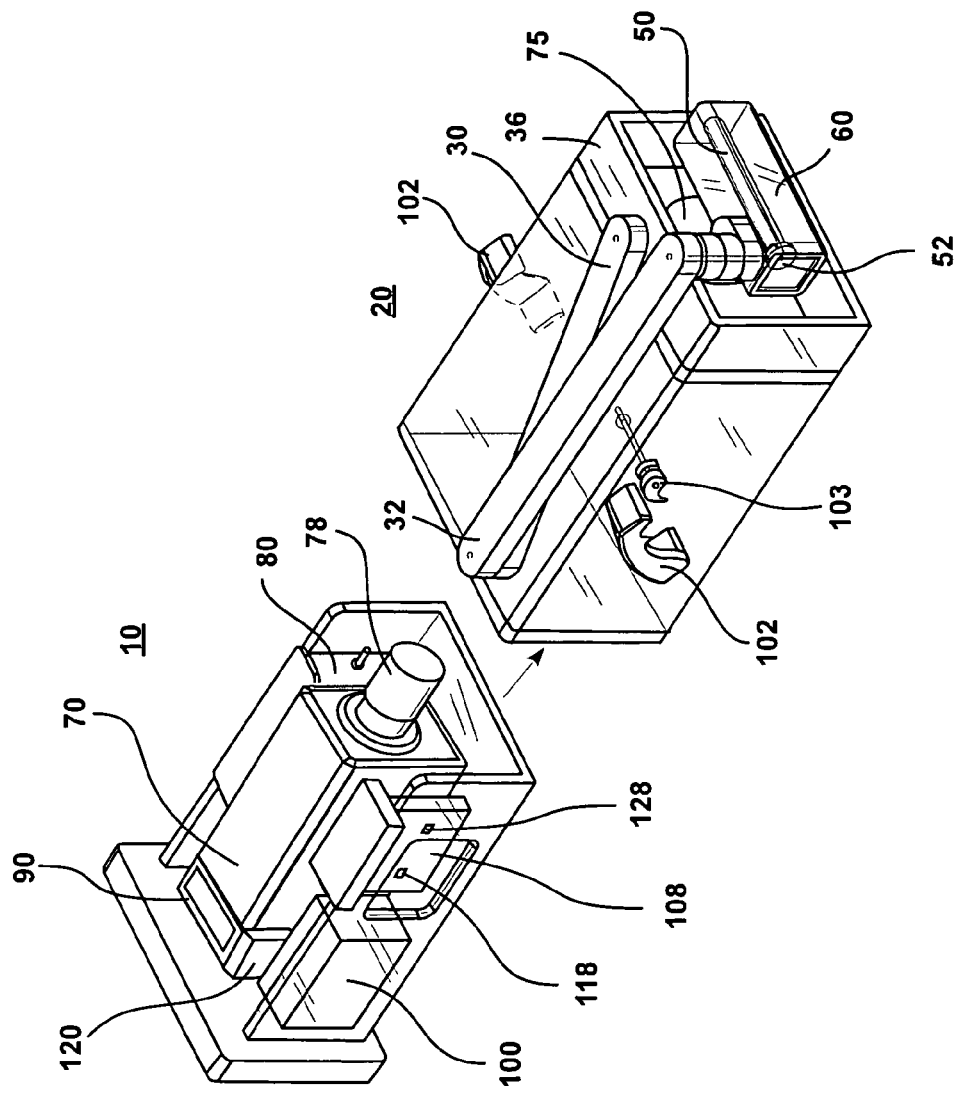
FIG. 3 is a first perspective view showing an embodiment of the apparatus of the present disclosure.

FIG. 3 shows a perspective view of an embodiment of the velocimetry apparatus of the present disclosure. According to such embodiment, an assembly of internal components (10) is insertable into a waterproof main body (20) to form a waterproof housing. An arm (30) is located on the main body (20). FIG. 3 shows an embodiment where such arm is retractable. However, other embodiments can be provided, where the arm (30) is, for example, telescopic or located at a fixed distance from the main body (20).

The assembly (10) contains the imaging optics referred to in FIG. 1, while the main body (20) contains the light sheet optics (two-dimensional embodiment), including a light source (50), a cylindrical lens and a cylindrical lens holder (52), as explained below.

A waterproof housing (60) containing the light source (50) is located on the distal end of the retractable arm (30). On the other hand, the assembly (10) comprises a camera (70) with a camera lens (78), timing electronics (80), a real-time television display (90), and battery (100). In one embodiment, the battery (100) is adapted to power the camera (70), the timing circuit (80) and the light source (50). The camera (70) can be a standard-frame rate camera or high speed camera, comprising one or more imagers. If more imagers are included, those imagers can be parallel to each other. In particular, the presence of a plurality of imagers will allow a 3D volume of water to be imaged. The display (90) faces upward so that a diver looking down at the main housing can see it. The camera lens (78) can be interchangeable (e.g., screw-off) in case a different type of lens is desired, e.g., wide-angle lens, zoom lens, etc. Typically, a 55 mm lens can be used.

A real-time television display is a "live feed" of what the camera (70) is seeing. An alternative to the display could be that of having the diver look directly at the illuminated particles/animal and to identify their position in space relative to the apparatus. This involves some guesswork/trial-and error; hence the television display is much more preferable.

In the embodiment of FIG. 3, the main body (20) and the housing (60) are shown as transparent. However, the person skilled in the art will understand that only the viewing port of camera (70) needs to be transparent. Such viewing port is indicated with (75) in FIG. 3, right behind the movable housing (60).

The camera (70) is designed to capture a single image each time a triggering control signal is received from the timing electronics (80). Such control signal can be in the form of voltage pulses. In particular, the timing circuit (80) can be programmed via computer software to output a series of voltage pulses at a predefined rate, thus determining the camera frame rate.

In the 2D embodiment of the present disclosure, two-dimensional images of water motion are collected. In such case, the light source (50) can be a laser beam output by light source (50), powered by battery (100). In particular, the laser source will allow light to me manipulated into a sheet shape, as already shown in the schematic diagram of FIG. 1. Any wavelength of laser light is feasible. By way of example and not of limitation, a 532 nm light can be used.

Figure 4:
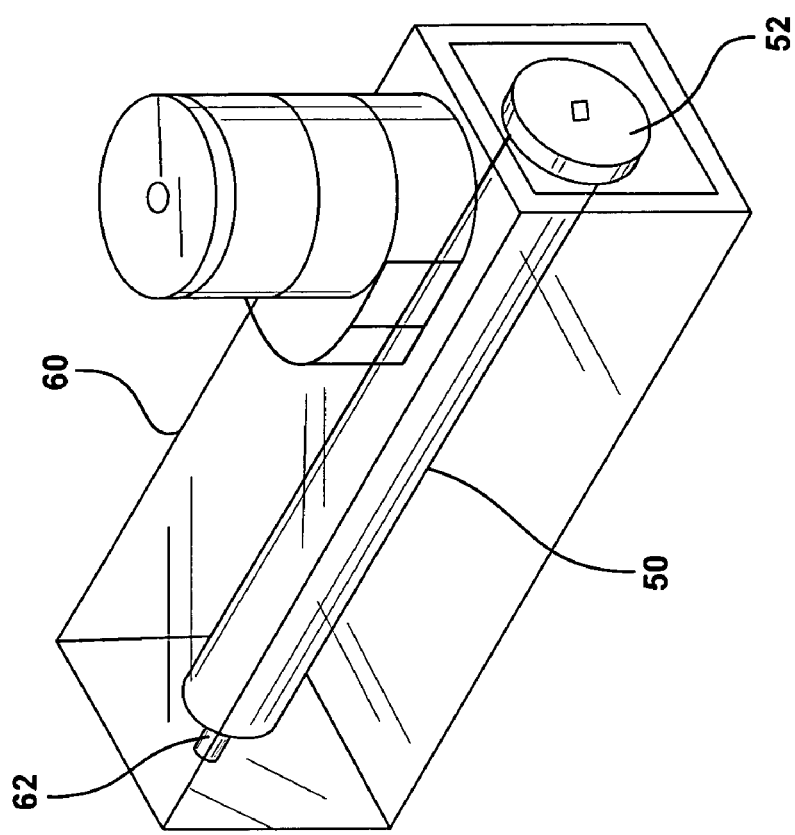
FIG. 4 is a second perspective view showing the light source section of the apparatus of the present disclosure.

Reference will now be made to the combination of FIGS. 3 and 4. In the two-dimensional embodiment, the housing (60) further contains additional optics for processing the laser beam coming from light source (50), such as a cylindrical lens and a cylindrical lens holder (52), as also shown in FIG. 4. In operation, the optics spread the laser beam from the light source (50) into a two-dimensional plane of light parallel to the field of view of the camera (70).

In the 3D embodiment, three-dimensional images of water motion are collected. In such case, the light source (50) can be a battery-powered white light source or any source that produces volume-shaped light. Even a laser light connected to suitable optics adapted to spread the laser beam into a volume of light can be used.

In both embodiments, the light source (50) and optics (when necessary, i.e. in laser-based 2D and 3D embodiments) are contained in a waterproof housing (60). The waterproof housing (60) can comprise an integrated manual power switch (62, see FIG. 4) to turn on the light source. Presence of switch (62) is optional. For example, light source (50) could be wired so that it is turned on at the same time as the video camera (70). For example, if the battery (100) powers both the video camera (70) and the light source (50), then a single switch could power both components simultaneously.

Reference will now be made to the combination of FIGS. 3-5. The main body (20) is also made of a waterproof housing and comprises handles (102), a manual camera power switch (104) (see FIG. 5), a manual timing electronics power switch (106) (see FIG. 5), a manual camera control switch (108), a data download port (110) (see FIG. 5), a battery charging port (112) (see FIG. 5), and an air purging port (114) (see FIG. 5). The handles (102) can be integral with the main body (20). The person skilled in the art will understand that features such as the handles, manual timing electronics power switch, data download port, battery charging port and air purging port are optional and can be dispensed with or replaced with other features.

According to an embodiment of the present disclosure, the manual control switch (108) of the camera (70) is a control pad (108) including RECORD (118) and STOP (128) buttons. In that embodiment, the manual camera control switch (108) can be associated to a lever (103) on the outside of the main housing that is connected by a bevel gear to a second lever inside the housing. If the lever (103) is rotated in one direction (e.g., clockwise), the bevel gear causes the second lever in the housing to press the RECORD button (118) on the camera. If the lever (103) is rotated in another direction (e.g., counter-clockwise), the bevel gear causes the second lever in the housing to press the STOP button (128) on the camera.

The apparatus of the present disclosure is portable. The embodiment discussed above allows portability through use of the handles (102). An alternative embodiment can provide the presence of a belt/body harness, but for safety reasons it would need to be "ditchable" in the event of an emergency. A further embodiment can also be hands-free and able to be attached, for example, to the head of the diver, so that the camera sees whatever the diver is looking at with his/her own eyes, and the light source would be projected from a helmet, like a coal miner's helmet. Alternatively, the apparatus and method of the present disclosure can also be provided on a mask to be worn by a diver.

In operation, the handles (102) will be used by the SCUBA diver to hold the apparatus (10) and to point the apparatus (10) at the target of interest. Target tracking is aided by the real-time television display (90), to which images collected by the camera (70) are transferred via a Radio Corporation of America (RCA) jack connector or any other connector able to transmit a video signal.

Figure 5:
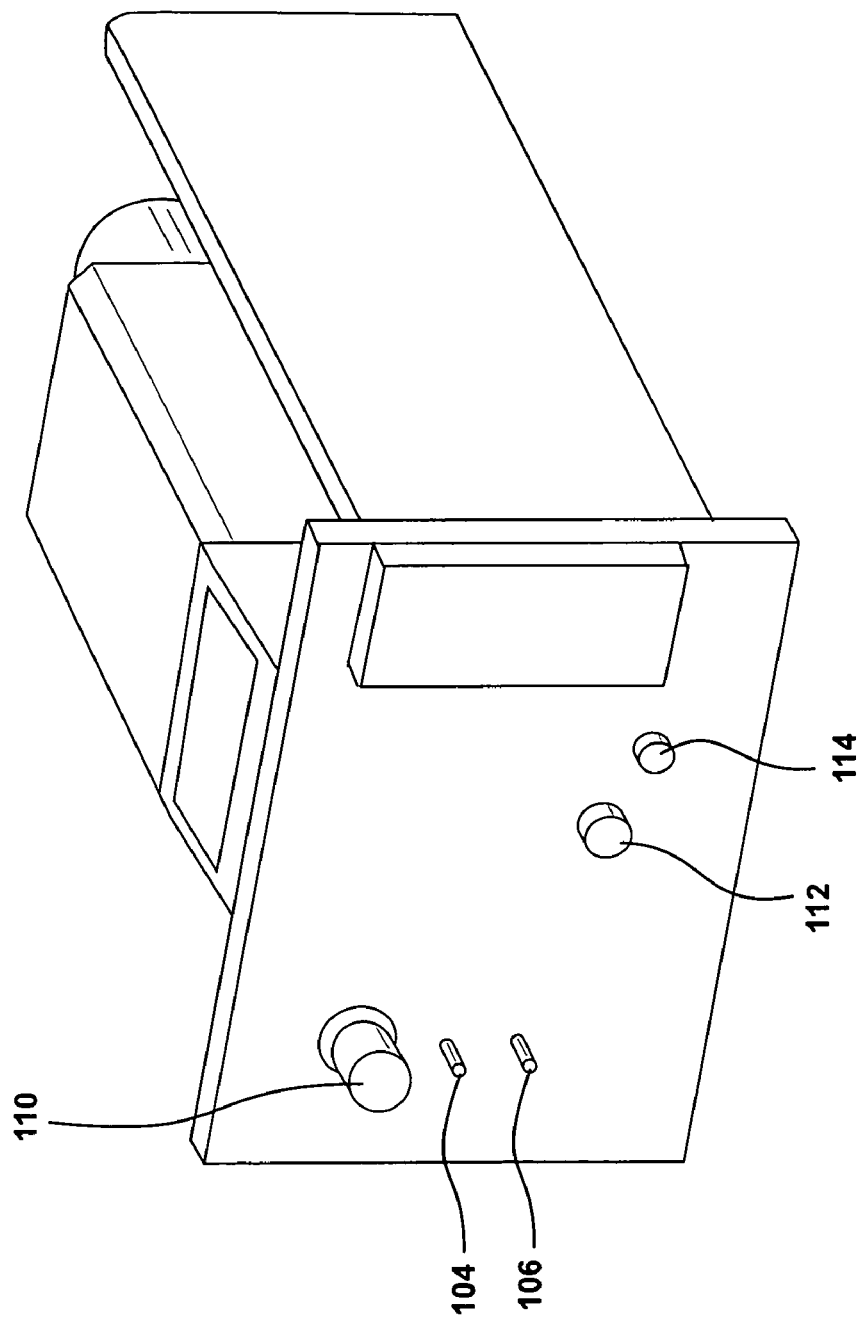
FIG. 5 is a third perspective view showing the rear portion of the apparatus of the present disclosure.

In the embodiment shown in FIGS. 3-5, power from the battery (100) can be transmitted to the camera (70) by closing the manual power switch (104) (FIG. 5) on the electrical wires that connect the battery (100) to the camera (70). On the other hand, power from the battery (100) can be transmitted to the timing electronics (80) by closing the manual power switch (106) on the electrical wires that connect the battery (100) to the timing electronics (80). Alternatively, a single master switch could be used in place of switches (104, 106), so that the camera (70) and timing electronics (80) are powered simultaneously. The battery (100) can be recharged by an external power source via an optional battery charging port (112) shown in FIG. 5.

Ambient particles suspended in the water reflect light from the light source (40) toward the main body (20). In order for this to happen, the only requirement of the light source is that its wavelength is smaller than the particles that scatter the light. In this case, Mie light scattering occurs, which reflects light in all directions. Hence, the camera will inevitably receive some of the reflected light.

The camera (70) in the main body (20) digitally records the reflected light onto a storage device, such as a hard disk or a digital video tape. Also analog recording is possible, but a digital embodiment is preferable. Image recording is initiated and stopped by depression of waterproof lever (103), which interfaces to the keypad (108) shown in FIG. 3 to activate the RETURN and STOP commands or buttons. Alternatively, the images could be constantly recorded from the point the camera (70) is turned on until the data storage/tape runs out.

After camera initiation, each image recording event is triggered by the timing electronics (80). For example, timing electronics (80) can automatically generate a 5 volt transistor-transistor logic (TTL) pulse. A typical combination of camera (70) and timing electronics (80) is the Photon APX-RS (Itronx, Inc.) and the Signal Forge 1000 (Signal Forge, Inc.), respectively. The electrical signal from the timing device (80) is transmitted to the camera (70) by a connector, such as a bayonet Neill-Concelman (BNC) cable connector (i.e. a standard electrical connector that has a robust locking mechanism for easy attachment/removal) or any connector that carries current and voltage.

The rate at which the camera (70) records images of the reflected light can be pre-programmed into the timing electronics (80). For a standard frame-rate camera (30 frames captured per second), the timing electronics (80) is built-in to the camera (70) and therefore unnecessary as a separate component.

Images stored on the camera (70) can be transferred to a computer for subsequent analysis via the data download port (110) shown in FIG. 5. The port (110) is connected to the camera (70) by a cable, such as a Gigabit Ethernet cable, USB cable, FireWire cable and so on.

To avoid air condensation in the waterproof housing during cold water operation, the ambient air in the housing can be purged and replaced with dry air or nitrogen by using the air purging port (114) (FIG. 5). Air is purged before the dive, when done at all.

With reference again to FIG. 3, the retractable arm (30) is collapsible by manually folding it at the elbow joint (32) and rotating its screw connection to the main body (20). Retractability of the arm (30) is useful for getting the device into/out of the water; it makes the apparatus easier to handle. It is not essential, however. The arm could be telescopic or rigid, or the laser and camera housing could merge into one large housing. The apparatus (10) can be held by the SCUBA diver as the diver swims to the target location. The retractable arm (30) can be extended by manually unfolding the arm until detents (36) on the arm lock into place. The detent (36) ensures that the light source (50) is precisely oriented with respects to the camera (70). In particular, when the arm (30) is extended, a small spring loaded ball (not shown) locks into detent (36). Another pair of detents (not shown) can be provided i) on the joint connecting the two portions of the arm (30) and ii) on the joint connecting the arm (30) to the housing (60).

The images of reflected light collected by the camera (70) indicate the spatial positions and the motion of the ambient particles suspended in the water, from which the water motion can be directly inferred.

In the implementation of DPIV shown in FIG. 1, the laser and the camera are statically fixed to the floor or table of a laboratory, so that they do not move with respect to one another or with respect to the container holding the water flow. In this way, the camera is properly focused on the light sheet and the water motion is measured relative to a frame of reference that is known a priori. However, once the camera and the light source are inside a portable, self-contained device operable by a diver, some problems need to be solved. Such problems are i) compensation of the DPIV methodology for diver motion and ii) maintenance of a fixed orientation of the camera relative to the light source.

With reference to the first issue, the present disclosure provides means for taking into account and compensating for the motion of the diver. Such issue is not trivial and not solved by prior art SCUBA-operated cameras, because such cameras are not measuring water motion and are only concerned with collecting images of an animal (i.e. the animal is either in the camera field of view or it is not).

A first way according to which the present disclosure solves the driver motion problem is through subtraction of the spatially-averaged velocity field. According to such method, the motion of the diver is subtracted from the DPIV measurements by i) taking a spatial average of the measured velocity field (i.e. the grid of the velocity vectors shown in the left portion of FIG. 2) and ii) subtracting that value from the entire velocity field. In particular, step i) is performed by computing the arithmetic average of the horizontal component of the measured velocity vectors at each position in the field of view, to determine the average horizontal motion of the diver; and by computing the arithmetic average of the vertical component of the measured velocity vectors at each position in the field of view, to determine the average vertical motion of the diver. Step ii) is performed by first constructing an average velocity vector that has the same horizontal and vertical components as the average motions computed in step i); this average velocity vector is then subtracted from each of the original measured velocity vectors.

An alternative way according to which the present disclosure solves the driver motion problem is that of measuring the diver motion using an accelerometer (see, for example, element (120), schematically shown in FIG. 3). According to such method, the diver acceleration can be measured using a linear or angular accelerometer inside the main housing. The accelerometer outputs a voltage signal proportional to the instantaneous acceleration of the diver. This signal can be integrated in time to determine the instantaneous diver velocity, which can then be subtracted from the measurements. The subtraction is performed a posteriori on the velocity field measurements, i.e., not during the data collection but afterward during data processing.

With reference to the second issue of maintenance of a fixed orientation of the camera relative to the light source, such issue is not problematic in the prior art DPIV implementation shown in FIG. 1, given that the laser and the camera are aligned with each other by keeping them in a predefined location in the laboratory such that the camera is always properly focused on the light sheet. On the other hand, a potential challenge in the implementation of a self-contained underwater velocimetry apparatus is maintenance of a fixed orientation between the camera and the laser light sheet so that the particles in the light sheet are always in focus and viewed from the same orientation with respect to the camera. This issue is not solved by prior art SCUBA-operated cameras because they are not focused on a light sheet (i.e. they use general volumetric illumination). Further, prior art cameras have autofocus and/or longer depths of focus so that they can image animals at arbitrary distances from the camera. These optical methods are not suitable for DPIV.

On the other hand, the present disclosure achieves fixed orientation by making position and orientation of the light source adjustable with respect to the camera. In the embodiments shown in FIGS. 3-5, this is obtained by providing a retractable and orientable arm connecting the housing where the camera is located with the housing where the light source is located. Retractability and orientability of the arm (e.g., using the joints and detents in the arm) makes the device manageable by a single SCUBA diver, whereas the larger prior art unmanned devices with rigid laser-camera connections are not retractable and therefore are unwieldy in a self-contained configuration.

Additionally, it should also be noted that previous implementations of DPIV in the laboratory or underwater use lasers that are wall-plug-in or fiber-optic based (with power source on a boat or shore). Therefore, self-containment is not possible. This issue is not solved by SCUBA operated cameras because they use general volumetric illumination that can be provided by standard battery-powered lights (SCUBA operated cameras are also not designed to image laser-illuminated particles in the water; they are intended for much larger objects). The applicants accomplish laser sheet illumination by providing a portable energy source adapted to power the light source. In particular, according to an embodiment of the present disclosure, laser sheet illumination is accomplished by using a battery-powered laser beam and a rigidly-mounted cylindrical lens that spreads the source beam into a thin sheet. The laser beam is sufficiently high-power that particles reflected by the laser sheet can be seen both by the camera and by the naked eye, so that a diver can use the illumination to position the camera in the water.

On the other hand, in the prior art implementation of FIG. 1, even if the naked eye cannot make out the particles, the camera is typically sensitive enough to see them, and therefore the camera can be aligned based on images output to a computer in the laboratory (e.g., by trial and error).

In such respect, the applicants' use, in an embodiment of the present disclosure, of a real-time television display that is viewable by the diver enables the same capability for particle image targeting in low light conditions, but without the need for a computer interface. Such real-time display complements targeting by the naked eye of the SCUBA diver.

Images collected from the self-contained velocimetry apparatus in accordance with the present disclosure can be analyzed by using the image processing technique of Reference [6] for two-dimensional measurements and by using the technique of Reference [7] for three-dimensional measurements. All References [1]-[8] discussed in the present application and detailed below are incorporated herein by reference in their entirety.

According to some aspects of the present disclosure, a velocimetry apparatus and method for the collection of target-specific images of fluid motions are disclosed. The apparatus includes a camera and a light source. The camera collects and provides images of the fluid showing instantaneous positions of particles in the fluid. The light source provides a light sheet (two-dimensional) or volume (three-dimensional) to illuminate the particles. The camera and the light source are powered by portable energy sources and measure instantaneous velocity of the fluid in a field of view. Shape and distance between first camera, the light source and the portable energy sources are so configured that the apparatus is a self-contained apparatus portable by a diver during operation thereof.

Accordingly, what has been shown is an apparatus and method for the collection of target-specific images of fluid motion. While the invention has been described by means of specific embodiments and applications thereof, it is understood that numerous modifications and variations could be made thereto by those skilled in the art without departing from the spirit and scope of the invention. It is therefore to be understood that within the scope of the claims, the invention may be practiced otherwise than as specifically described herein.

It is to be understood that the present disclosure is not limited to particular arrangements devices and methods, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. Unless defined otherwise, all technical and scientific terms used herein have the same meaning as commonly understood by one of ordinary skill in the art to which the disclosure pertains. Although any methods and materials similar or equivalent to those described herein can be used in the practice for testing of the disclosure(s), specific examples of appropriate materials and methods are described herein.

REFERENCES

[1] Katz, J., Donaghay, P. L., Zhang, J., King, S. and Russell, K. (1999). Submersible holocamera for detection of particle characteristics and motions in the ocean. *Deep Sea Res.* 46, 1455-1481.

[2] Bertuccioli, L., Roth, G. I., Katz, J. and Osborn, T. R. (1999). A submersible particle image velocimetry system for turbulence measurements in the bottom boundary layer. *J. Atm. and Ocean. Tech.* 16, 1635-1646.

[3] Nimmo Smith, W. A. M., Atsavapranee, P., Katz, J. and Osborn, T. R. (2002). Piv measurements in the bottom boundary layer of the coastal ocean. *Exp. Fluids* 33, 962-971.

[4] Steinbuck, J. V., Troy, C. D., Franks, P. J., Karakoylu, E., Jaffe, J. S., Monismith, S. G. and Horner, A. R. (2004). Small-scale turbulence measurements with a freefalling DPIV profiler. Presented at 2004 *Amer. Geophys. Un.*

[5] Clarke, J., Cotel, A. and Tritico, H. (2007). Development, testing and demonstration of a portable submersible miniature particle imaging velocimetry device. *Meas. Sci. Tech.*, vol. 18, 25552562.

[6] Willert, C. E., Gharib, M. (1991). Digital particle image velocimetry. *Exp. Fluids* 10, 181-193

[7] Willert, C. E., Gharib, M. (1992). 3-dimensional digital particle imaging with a single camera. *Exp. Fluids* 12, 353-358.

[8] Raffel, M., Willert, C. and Kompenhans, J. (1998). Particle Image Velocimetry: *A Practical Guide*. New York, Springer, Section 1.2, 3-6.

What is claimed is:

1. A velocimetry apparatus for the collection of target-specific images of fluid motions, comprising:
a first camera, adapted to collect and provide images of a fluid showing instantaneous positions of particles in the fluid;
a timing circuit associated with the first camera, controlling a frame rate of the first camera;
a light source adapted to provide a light sheet or volume to illuminate the particles in the fluid; and
one or more portable energy sources adapted to power the first camera, the timing circuit and the light source,
wherein the first camera and the light source are adapted to measure instantaneous velocity of the fluid in a field of view by way of a digital particle image velocimetry technique, and
wherein shape and distance between the first camera, the timing circuit, the light source and the one or more portable energy sources are so configured that the apparatus is a self-contained apparatus portable by a diver during operation thereof.

2. The apparatus of claim 1, further comprising a real-time television display.

3. The apparatus of claim 1, wherein:
the field of view is a two-dimensional field of view, and
the light source is a laser light source.

4. The apparatus of claim 3, wherein the light source is adjustable with respect to the camera, to obtain a desired positioning and orientation of the light source with respect to the camera.

5. The apparatus of claim 3, further comprising optics connected with the laser light source.

6. The apparatus of claim 5, wherein the optics comprises a cylindrical lens coupled with the laser light source and a cylindrical lens holder.

7. The apparatus of claim 3, wherein the laser light source is adapted to emit pulsed laser light.

8. The apparatus of claim 3, wherein the camera is a high-speed camera.

9. The apparatus of claim 1, wherein the field of view is a three-dimensional field of view.

10. The apparatus of claim 9, further comprising a second camera spaced from the first camera and also adapted to collect and provide images of the fluid showing instantaneous positions of particles in the fluid, the combination of the first camera and second camera allowing to compute three-dimensional position of the particles in the fluid.

11. The apparatus of claim 9, wherein the first camera comprises two imagers, each imager adapted to collect and provide images of the fluid showing instantaneous positions of particles in the fluid, the combination of the two imagers allowing to compute three-dimensional position of the particles in the fluid.

12. The apparatus of claim 9, wherein the light source is a source producing volume-shaped light.

13. The apparatus of claim 1, wherein the light source is a white light source.

14. The apparatus of claim 12, wherein the light source is a laser light source coupled with optics to produce the volume-shaped light.

15. The apparatus of claim 1, the apparatus comprising a body and an arm attached to the body, wherein the first camera is located inside the body and the light source is connected with the arm, the body comprising a viewing port to allow operation of the first camera.

16. The apparatus of claim 15, wherein the arm is a retractable or telescopic arm.

17. The apparatus of claim 15, wherein the light source is located in a housing connected with the arm.

18. The apparatus of claim 17, wherein the body and the housing are transparent.

19. The apparatus of claim 17, further comprising a light source power switch to activate the light source.

20. The apparatus of claim 1, wherein the timing circuit is located inside the first camera.

21. The apparatus of claim 1, wherein the timing circuit is located outside the first camera.

22. The apparatus of claim 1, wherein the timing circuit controls the frame rate of the first camera through a series of voltage pulses.

23. The apparatus of claim 1, wherein the portable energy source is a battery.

24. The apparatus of claim 1, wherein the fluid motions are water motions in a marine environment.

25. The apparatus of claim 1, further comprising handles to allow portability of the apparatus by the diver during operation.

26. The apparatus of claim 1, further comprising a switch for manual control of the first camera.

27. A method for collection of target-specific images of fluid motion to be performed by a diver, comprising:
illuminating particles in a fluid; and
collecting images of the illuminated particles to measure instantaneous velocity of the fluid by way of a digital particle image velocimetry (DPIV) technique, said technique taking into account compensation of diver motion.

28. The method of claim 27, wherein compensation of diver motion is obtained through subtraction of diver motion from DPIV measurements.

29. The method of claim 27, wherein illuminating the particles in the fluid is performed through a light source, collecting images of the illuminated particles is performed through a camera portably associated with the light source, and compensation of diver motion is obtained through an accelerometer portably associated with the light source and the camera.

* * * * *